United States Patent Office.

LOUIS HENRY GUSTAVUS EHRHARDT, OF LONDON, ENGLAND, ASSIGNOR TO GEORGE B. UPTON, DAVID D. STACKPOLE, AND SAMUEL H. GOOKIN.

Letters Patent No. 85,576, dated January 5, 1869.

IMPROVEMENT IN THE MANUFACTURE OF GUNPOWDER.

The Schedule referred to in these Letters Patent and making part of the same.

*To all whom it may concern:*

Be it known that I, LOUIS HENRY GUSTAVUS EHRHARDT, of London, England, have invented an Improved Gunpowder; and I do hereby declare the following to be a full and correct description of the same.

In the specification of Letters Patent, No. 55,795, granted to me, June 19, 1866, I described a gunpowder made by the combination of four ingredients, viz, nitrate of potash and chlorate of potash, mixed with mineral carbon and cutch, or some equivalent vegetable substance.

The gunpowder which I now desire to secure by Letters Patent is an improvement on that described in the specification of the patent referred to.

It consists of only two ingredients, viz, chlorate of potash, mixed in proper proportions with a vegetable extract, such as cutch, gambier, logwood, or the extracts of certain barks known in commerce as "tannin." A mixture of these extracts may be used, instead of any one of them.

To make this powder, the ingredients must be finely pulverized, and then intimately mixed. No granulation or other preparation is required. The proportions of the ingredients may be considerably varied, but the best proportion I have found is equal parts by weight of the chlorate and the extract.

The powder thus compounded is specially adapted to submarine and other blasting, but may be used in fire-arms.

Having thus described my invention,

What I claim, and desire to secure by Letters Patent, is—

The powder herein described, consisting of the ingredients named, prepared, and mixed, as specified.

The above specification of my said invention signed and witnessed at Montreal, this 8th day of May, A. D. 1868.

L. H. G. EHRHARDT.

Witnesses:
GEO. E. LINCOLN,
WM. HOUSMAN.